US009632910B2

(12) United States Patent
Klein (10) Patent No.: US 9,632,910 B2
(45) Date of Patent: Apr. 25, 2017

(54) SYSTEM AND METHOD FOR SOFTWARE DEBUGGING USING VARIABLE LOCATION

(75) Inventor: Udo Klein, Maximiliansau (DE)

(73) Assignee: SAP SE, Walldorf (DE)

( * ) Notice: Subject to any disclaimer, the term of this patent is extended or adjusted under 35 U.S.C. 154(b) by 1949 days.

(21) Appl. No.: 12/336,318

(22) Filed: Dec. 16, 2008

(65) Prior Publication Data

US 2010/0153921 A1  Jun. 17, 2010

(51) Int. Cl.
*G06F 9/44* (2006.01)
*G06F 11/36* (2006.01)
*G06F 11/32* (2006.01)

(52) U.S. Cl.
CPC ........ *G06F 11/3636* (2013.01); *G06F 11/366* (2013.01); *G06F 8/33* (2013.01); *G06F 9/44* (2013.01); *G06F 11/323* (2013.01); *G06F 11/36* (2013.01)

(58) Field of Classification Search
CPC .. G06F 11/3636; G06F 11/366; G06F 11/323; G06F 11/36; G06F 11/362; G06F 11/3666; G06F 8/33; G06F 9/44
USPC ................................................ 717/124, 100
See application file for complete search history.

(56) References Cited

U.S. PATENT DOCUMENTS

| 7,234,133 B2 | 6/2007 | Klein |
| 7,287,027 B2 | 10/2007 | Klein |
| 7,324,994 B2 | 1/2008 | Klein et al. |
| 7,328,228 B2 | 2/2008 | Klein et al. |
| 7,353,223 B2 | 4/2008 | Klein |
| 7,533,135 B2 | 5/2009 | Klein et al. |
| 7,558,794 B2 | 7/2009 | Klein et al. |
| 7,849,450 B1 * | 12/2010 | Rydh ............... G06F 11/366 717/129 |
| 2003/0041315 A1 * | 2/2003 | Bates ............... G06F 11/3636 717/129 |
| 2007/0100832 A1 | 5/2007 | Klein |

(Continued)

OTHER PUBLICATIONS

Zeller, Andreas "Why Programs Fail—A Guide to Systematic Debugging", Mogan Kaufamnn Publishers, © 2006 by Elsevier Inc. (USA)—Selected section—Forward & Preface (26 pgs).*

(Continued)

*Primary Examiner* — Qing Chen
*Assistant Examiner* — Mohammad Huda
(74) *Attorney, Agent, or Firm* — Fish & Richardson P.C.

(57) ABSTRACT

This disclosure provides software that identifies a variable in a computer program as a target variable. The software automatically processes a first source code statement in the computer program for the target variable. The software determines if the target variable is not found in the particular processed statement and progresses through preceding statements until the target variable is found. The software determines if the particular statement involves an indirect assignment to the target variable and can return that particular statement as the origination statement. Additionally, the software determines if the particular statement involves a direct assignment to the target variable from a second variable. If the particular statement involves a direct assignment to the target variable from a second variable, the software can change the target variable to the second variable and can progress through preceding statements until the new target variable is found in a particular of the statements.

19 Claims, 3 Drawing Sheets

(56) References Cited

U.S. PATENT DOCUMENTS

| | | |
|---|---|---|
| 2007/0153317 A1 | 7/2007 | Klein |
| 2007/0226298 A1 | 9/2007 | Klein |
| 2008/0109436 A1 | 5/2008 | Klein et al. |
| 2008/0127149 A1* | 5/2008 | Kosche .................. G06F 8/443 717/158 |
| 2009/0019424 A1 | 1/2009 | Klein et al. |
| 2009/0024552 A1 | 1/2009 | Klein |
| 2009/0328005 A1* | 12/2009 | Miskelly ............. G06F 11/3636 717/125 |

OTHER PUBLICATIONS

Zeller, Andreas "*Why Programs Fail—A Guide to Systematic Debugging*", Mogan Kaufamnn Publishers, © 2006 by Elsevier Inc. (USA)—Selected section—Chapter 6 , Scientific Debugging (pp. 145-166).

Zeller, Andreas "*Why Programs Fail—A Guide to Systematic Debugging*", Mogan Kaufamnn Publishers, © 2006 by Elsevier Inc. (USA)—Selected section—Chapter 7, Deducing Errors (pp. 167-198).

Zeller, Andreas "*Why Programs Fail—A Guide to Systematic Debugging*", Mogan Kaufamnn Publishers, © 2006 by Elsevier Inc. (USA)—Selected section—Chapter 8, Observing Facts (pp. 199-241).

Zeller, Andreas "*Why Programs Fail—A Guide to Systematic Debugging*", Mogan Kaufamnn Publishers, © 2006 by Elsevier Inc. (USA)—Selected section—Chapter 9, Tracking Origins (pp. 243-256).

Zeller, Andreas "*Why Programs Fail—A Guide to Systematic Debugging*", Mogan Kaufamnn Publishers, © 2006 by Elsevier Inc. (USA)—Selected section—Index (pp. 439-448).

* cited by examiner

SYSTEM AND METHOD FOR SOFTWARE DEBUGGING USING VARIABLE LOCATION

TECHNICAL FIELD

The present disclosure relates to systems, methods, and software for debugging computer applications, such as computer programming development environments and, more particularly, to methods and software for debugging these applications using variable location.

BACKGROUND

Software debugging systems are a common tool included with integrated development environments (IDEs). These IDEs are an example of a visual tool for creating software that brings together applications for editing, testing, running and debugging computer source code. In general, software debugging systems can be used to work backwards from the wrong output to the place where "things start to become wrong." As such, software debugging systems and applications provide computer programmers and software developers with tools to help eliminate so-called "bugs" or problems with the systems and applications that are created. Further, some software debugging systems offer visual tools for creating software that illustrate to a user various portions of an application. In some cases, the cost of testing and maintaining software can outweigh the cost of actually developing the software. Software debugging tools can provide an efficient mechanism to search for bugs by allowing developers to look at specific portions of source code as they are executed.

In many instances, software developers may want to determine the source of a problem in a portion of an application by examining specific items in the source code such as methods, subroutines, functions, variables, and other items in the source code. In some cases, the origin of values assigned to different variables included in a software application can be difficult to find. With many developers working on larger and more complex applications, a mechanism for finding the origins of values assigned to variables and how those values are propagated throughout an application can be useful.

SUMMARY

This disclosure provides various embodiments of software for tracking a target variable for debugging. In one aspect, the software identifies a variable in a computer program as a target variable. The software automatically processes a first source code statement in the computer program for the target variable. The software can further determine if the target variable is not found in the particular processed statement and can progress through preceding statements in the computer program until the target variable is found. The software can further determine if the particular statement involves an indirect assignment to the target variable and can return that particular statement as the origination statement. Additionally, the software can determine if the particular statement involves a direct assignment to the target variable from a second variable. If the particular statement involves a direct assignment to the target variable from a second variable, the software can change the target variable to the second variable and can progress through preceding statements until the new target variable is found in a particular of the statements.

This disclosure provides various embodiments of software for tracking a target variable for debugging. In one aspect, the software identifies a variable in a computer program as a target variable. The software automatically processes a first source code statement in the computer program for the target variable. The software can then determine if the target variable is not found in the particular processed statement and can progress through preceding statements in the computer program until the target variable is found. The software can then determine if the particular statement involves an indirect assignment to the target variable from a result of a method call. The software can further determine if the particular statement involves a direct assignment to the target variable from a second variable. If the particular statement involves a direct assignment to the target variable from a second variable, the software can change the target variable to the second variable and can progress through preceding statements until the new target variable is found in a particular of the statements. The software can then determine if the particular statement involves another indirect assignment to the target variable and can return that particular statement as the origination statement. The software can then determine if the particular statement involves a direct assignment to the target variable from a second variable. If the particular statement involves a direct assignment to the target variable from a second variable, the software can change the target variable to the second variable and progress through preceding statements until the new target variable is found in a particular of the statements.

Implementations may include one or more of the following features. The software can be written in one of a plurality of languages. The software can include an indirect assignment comprising the target variable being determined by a plurality of other variables. The software can include an indirect assignment comprising a result from a method call. The software can include an indirect assignment comprising population from an external source. The software can include an indirect assignment comprising population from a database. The software can access a call stack storing statements of the computer program so that the software can process the statements. The software can parse and map statements of the computer program. The software can automatically progress through at least one preceding statement bound at runtime. The software can include a first variable consisting of a non-constant value.

While generally described as software, some or all of these aspects may be further included in respective systems or other devices for executing, implementing, or otherwise analyzing a suitable system. The details of these and other aspects and embodiments of the present disclosure are set forth in the accompanying drawings and the description below. Other features, objects, and advantages of the preferred embodiment will be apparent from the description and drawings, and from the claims.

DETAILED DESCRIPTION

This disclosure generally describes software, methods, and systems for debugging computer programming source code at run-time according to a particular implementation of the present disclosure. At a high level, a debugger can be any software that runs, at least partially, simultaneously with a computer program to track various processes and instructions, often through a call stack. For example, the debugger may comprise an agent that tracks the call stack as it is processed and passes this information to distributed development environment. In another example, the debugger may comprise a standalone program that runs the program in "debug" mode to process individual statements. In certain situations, it allows a user to pause the computer program and read memory addresses, call stack information, and various other normally invisible parts of a computer program. In the process of the place where "things start to become wrong," debuggers can be used to look at variable values and then work up the call chain to look where the values at hand were established. More specifically, this can be achieved by browsing the call stack and looking for the variable, including those situations where that specific value is moved between variables (often with differing names) back and forth. In other words, the present disclosure offers various techniques to automatically infer where a value actually originated and how it was propagated. Indeed, this can often be achieved in such a way that a developer or support expert can request this information easily. Moreover, the debugging software described in this disclosure can analyze "generic" programming code. Further, in certain situations, the disclosed debugging software described in this disclosure can analyze code that is bound at runtime. The debugging software described in this disclosure can also determine the location of computer programming variables without additional reasoning logic because at runtime bindings can be evaluated.

Figure 1:
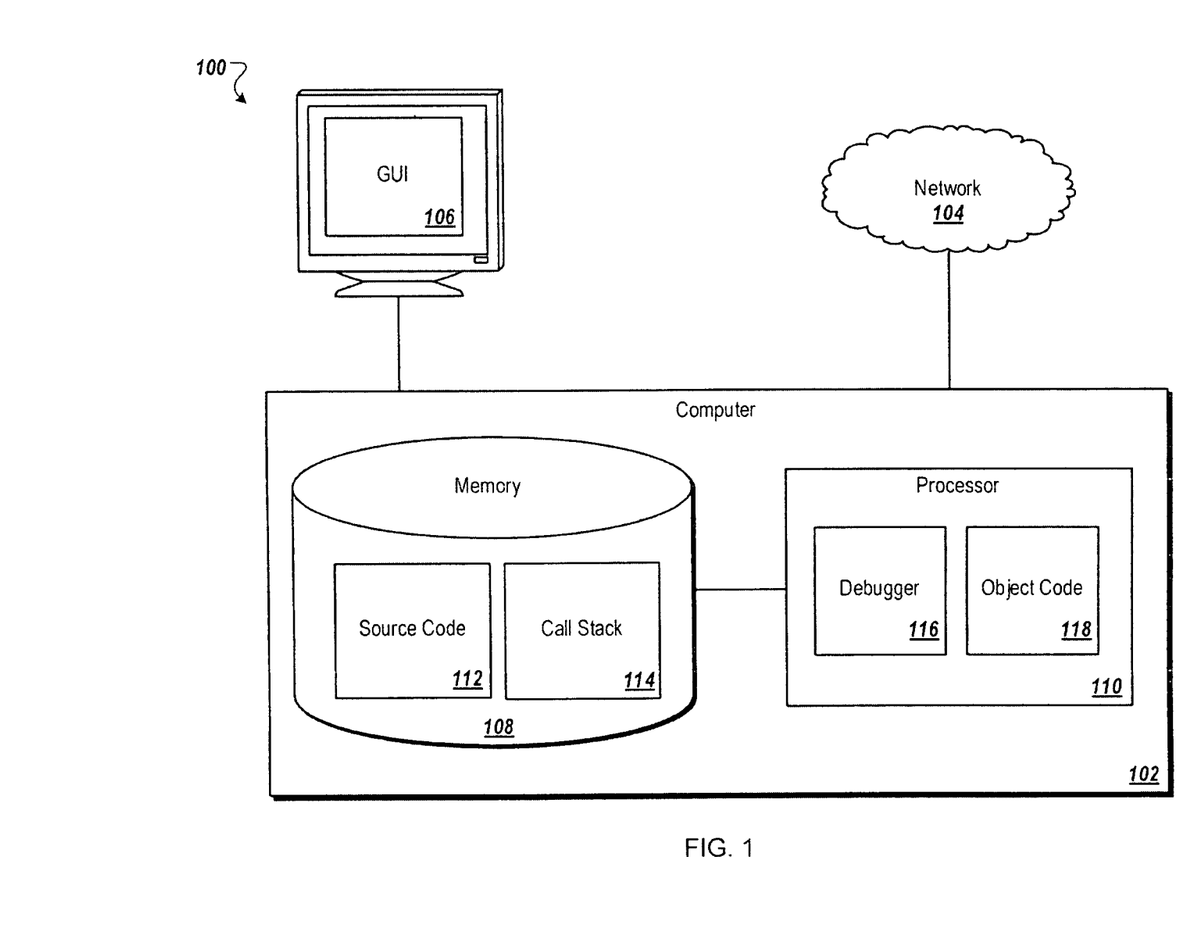
FIG. 1 illustrates a software environment capable of debugging computer programming source code at run-time according to a particular implementation of the present disclosure.

Turning to the example implementation of FIG. 1, the illustrated software and hardware environment 100 includes, or is communicably coupled with, one or more computers 102, a network 104 and a graphical user interface (GUI) 106. Each of the one or more computers 104 comprise electronic computing devices operable to receive, transmit, process, store, or manage data and information associated with the software and hardware environment 100. As used in this document, the term "computer" is intended to encompass any suitable processing device. For example, the environment 100 may be implemented using devices other than computers, including a server pool. Further, any computer 102 may be adapted to execute any operating system, including Linux, UNIX, Windows, Windows Server or any other suitable operating system. Indeed, computer 102 may comprise a client, server, or other machine capable of executing, implementing, or otherwise processing instructions. In the illustrated embodiment, the computer 102 is a device used to provide a computer programming environment via the network 104 to the one or more GUIs 106, as well as other users external to environment 100.

In the present implementation, and as shown in FIG. 1, the computer 102 can include memory 108 and a processor 110. The computer 102 can be any computer that can be used for the operations described in association with the system 100 according to one implementation. In some implementations, the computer 102 can receive requests initiated from a GUI, such as the GUI 106, and the requests can be processed by the processor 110. For example, the computer 102 can receive a request to launch an integrated development environment for developing computer software.

The example computer 102 includes memory 108. Each memory may include any memory or database module and may take the form of volatile or non-volatile memory including, without limitation, magnetic media, optical media, random access memory (RAM), read-only memory (ROM), removable media, or any other suitable local or remote memory component. Each memory 108 may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular computer. Each memory 108 may also include any other appropriate data, such as VPN applications, a security or access log, print or other reporting files, as well as others. For example, memory 108 may store an application or other program for execution, a debugger, debugging logs, and so forth. Again, the particular data stored in each memory 108 will be described in detail below along with the further description of the related computer.

In the illustrated example, the memory 108 includes the source code 112 and the call stack 114. The source code 112 is any collection of statements or declarations written in some human-readable computer language. For example, source code can be stored in memory (e.g., memory 108 of FIG. 1) where segments of the memory can be allocated to include data structures such as a text file or stored procedures in a database. The source code 112 can be a collection of files needed to convert from human-readable form to some kind of computer-executable form. In some implementations, the source code 112 can be converted into an executable file by a compiler or an interpreter. A compiler refers to a computer program executed by the processor (e.g., processor 110 of FIG. 1) that translates source code 112 into object code 118. The object code 118 is described in more detail later in this disclosure. The source code 112 can be written in various computer programming languages including Microsoft Visual Basic, C++, Java, Fortran, Cobol, or other programming languages.

The call stack 114 is a dynamic stack data structure that stores information about the active statements or methods of a computer program. This kind of stack can also be referred to as an execution stack, control stack, function stack, or run-time stack. In some implementations, the call stack 114 can be used to keep track of the point to which each active statement or method should return control when it finishes executing. (The active methods are those which have been called but have not yet completed execution by returning). For example, a method DrawSquare calls a method DrawLine from four different places, the code of DrawLine has a way of knowing where to return. This is typically done by code for each call within DrawSquare putting the address of the instruction after the particular call statement (the "return address") onto the call stack.

The example computer 102 also includes a processor 110. Each processor 110 executes instructions and manipulates data to perform the operations of the associated computer 102, and may comprise, for example, a central processing unit (CPU), a blade, an application specific integrated circuit (ASIC), or a field-programmable gate array (FPGA), among other suitable options. Although the processor 110 is illustrated as a single processor, multiple processors may be used according to the particular needs of the associated computer. References to a single processor 110 are meant to include multiple processors where applicable. The operations that each processor 110 executes are determined by the purpose and operations of its associated computer. In one implementation, the processor 110 is a single-threaded processor. In another implementation, the processor 110 is a multi-threaded processor. The processor 110 can be capable of processing instructions stored in the memory 108 to display graphical information for a "graphical user interface" or GUI 106.

The GUI 106 comprises a graphical user interface operable to allow the user to interface with at least a portion of environment 100 for any suitable purpose, including allowing a user to view one or more "programming code segments," instructions, debugging logs or other results, and other information received from or for the computer 102. Generally, the GUI 106 provides users with an efficient and user-friendly presentation of data provided by or communicated within the system. The term GUI may be used in the singular or in the plural to describe one or more graphical user interfaces and each of the displays of a particular graphical user interface. Therefore, the GUI 106 can be any graphical user interface, such as the front end for an integrated development environment (IDE) or debugger, web browser, touch screen, or command line interface (CLI) that processes information in the environment 100 and efficiently presents the results to the user. In general, the GUI 106 may include a plurality of user interface (UI) elements such as interactive fields, pull-down lists, and buttons operable by the user.

The processor 110 executes the debugger 116 and the object code 118. The debugger 116 is a computer program that can be used to test and debug other computer programs. In some implementations, debuggers 116 can be included in a software package such as an integrated development environment (IDE). An IDE refers to software or a suite of software that comprises a source code editor, a compiler, and a debugger, to name a few common examples. In some implementations, the IDE can include version control software to track the different iterations and changes made to a portion of source code. The IDE can increase software development productivity by providing a suite of applications with a common user interface, displayable on a GUI (e.g., the GUI 106 of FIG. 1).

The object code 118 is the representation of code that a compiler generates by processing the source code 112. The object code 118 includes machine code information that can be directly executed by a computer processor. In some implementations, the object code 118 can include additional information such as data for use by the source code 112 at runtime, call stack information (e.g., call stack 114 of FIG. 1), comments, program symbols (e.g., names of variable and functions) and other debugging information. For example, the call stack information can include information used to "unwind" or step backwards into the call stack during debugging. In some implementations, the object code 118 can be stored in a file format unique to a particular computer type. In other implementations, the object code 118 can be stored in a portable format that can be used by many computer types. For example, a common object file format is the ".com" format, which can be accessible to one or more computers running the Microsoft Windows operating system.

Generally, the network 104 facilitates wireless or wireline communications between the components of the software environment 100 (i.e., between the computer 102 and other computers, web development servers, back-end servers, as well as between the other components as appropriate), as well as with any other local or remote computers. The network 104 is illustrated as a single network in FIG. 1. In any implementation, the network 104 may be a continuous or discontinuous network without departing from the scope of this disclosure. The network 104 may be all or a portion of an enterprise or secured network. In some instances, a portion of the network 104 may be a virtual private network (VPN), such as, for example, a connection between the computer 102 and a web development server. All or a portion of the network 104 can comprise either a wireline or wireless link. Example wireless links may include 802.11a/b/g/n, 802.20, WiMax, and/or any other appropriate wireless link. In other words, the network 104 encompasses any internal or external network, networks, sub-network, or combination thereof operable to facilitate communications between various computing components inside and outside the illustrated environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Figure 2A:
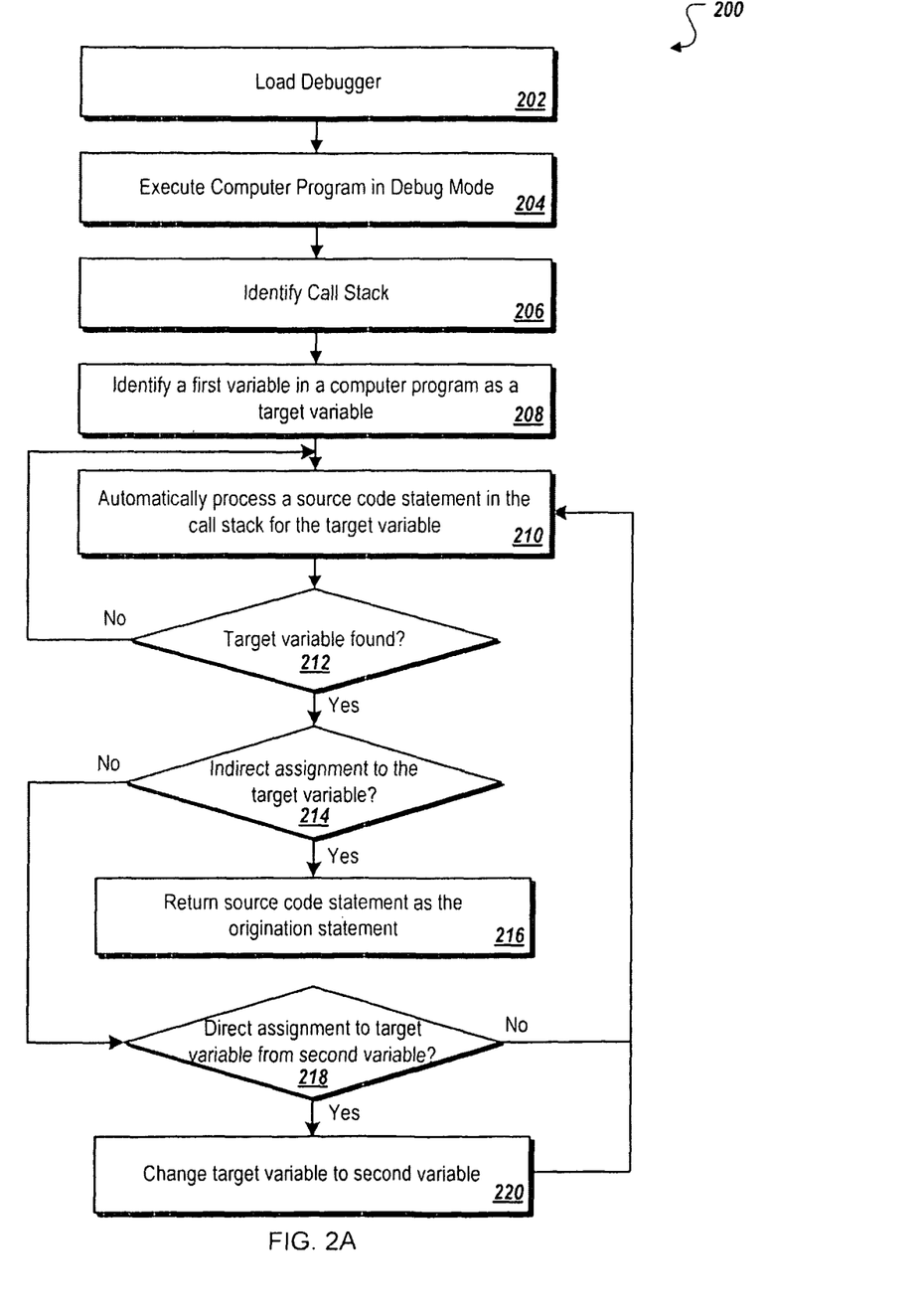
FIG. 2A is a flowchart illustrating one example of the steps for debugging computer programming source code using variable location using an appropriate system, such as the system described in FIG. 1.

FIG. 2A is a flowchart illustrating one example of the steps for debugging computer programming source code using variable location using an appropriate system, such as the system described in FIG. 1. For example, this example technique 200 could be represented by the pseudocode:

---

Start scanning backwards / upwards from the current statement and stack level (in one statement steps).
    If V is a constant stop scanning.
    If the scanned statement does not alter V continue scanning.
    If the scanned statement is an assignment for V proceed below
        If the statement is a direct assignment or equivalent to a
        direct assignment (e.g., V = W) then continue
        scanning for the source of the assignment (in the
        example this would be W).
        If the statement is not a direct assignment (e.g., V = W + X
        or V is derived by a subroutine / method call or
        filled from a database) then stop.
    If the topmost stack level is reached and all statements are scanned then stop.

---

In this example algorithm, a portion of programming source code can include a variable referenced by the name "V." In one example, the programming source code may encounter a problem during the debugging process and a user may believe that the variable "V" and its value are the cause, or can help find the cause of the problem. At the point where the programming source code fails or presents a problem, the debugging process can begin to scan from the point of failure in the call stack (e.g., call stack 114 of FIG. 1) to previous entries in the call stack. As each previous entry is scanned, various determinations can be made. If the variable "V" is found to be a constant, scanning can stop. If the scanned statement does not alter the value of variable "V," scanning can continue to the next entry in the call stack. If the scanned statement is an assignment for "V," additional determinations can be made relative to this particular scanned statement. If the statement is a direct assignment or equivalent to a direct assignment (e.g., V=W), then scanning can continue for the source of the assignment, in this example, "W." If the statement is not a direct assignment (e.g., V=W+X or V is derived by a subroutine or method call or filled from a database), then scanning stops. If the topmost level in the call stack is reached and all statements are scanned, then scanning can stop. The location where the implementation described above can stop is at the place where the variable "V" derives the value of "V" from. The above implementation indicates the highest call stack level where the value of "V" is already known.

It will be understood that the foregoing is for illustration purposes and is not meant to limit the scope of the disclosure. Put differently, the above example algorithm is meant to help provide context and description and other algorithms may implement functions and functionality disparate from it while remaining within the scope of the disclosure.

Turning to the illustrated example, at step 202, a debugger (e.g., debugger 116 of FIG. 1) is executed, launched, initialized, or otherwise loaded. In some implementations, the debugger 116 may be executed on a computer processor (e.g., the processor 110 of FIG. 1). At step 204, the processor executes a computer program in debug mode or otherwise processes a running program so that the call stack can be analyzed by the debugger. For example, a user operating as a software developer may use a GUI (e.g., the GUI 106 of FIG. 1) to view and initiate execution of a portion or all of the software application he/she is developing. In this example, a user can view information that may be helpful to find a problem in the software. In another example, a user can simply monitor the execution of the software, viewing the values of certain variables and statements in a systematic way.

At 206, the debugger identifies a call stack (e.g., call stack 114 of FIG. 1). In some implementations, the call stack can be identified visually in the context of an entire suite of software development applications. For example, a call stack viewing application can provide a view of the most recent statement or method on the call stack, with preceding statements visible to the user in a list format. The call stack can be identified and accessed from the computer's memory 108.

At 208, the debugger identifies a first variable in a computer program as a target variable. In some implementations, identifying a variable can including selecting a "target" variable using a GUI (e.g., the GUI 106 from FIG. 1). In some implementations, a "target" variable can be automatically identified by the debugging software as a potential source of the computer program failure.

At 210, the debugger automatically processes a source code statement (e.g., source code 112 of FIG. 1) in the call stack for the target variable. In some implementations, the debugger can iterate through one or more preceding statements bound at runtime. For example, statements can include assignments to variables other than the target variable and other source code statements.

At 212, the debugger determines whether the target variable has been found. In some implementations, the debugger can parse and interpret the source code so that the debugger can recognize any value assignments. For example, the debugger can determine a value assignment of "5" to a target variable "T."

At 214, the debugger determines whether an indirect assignment to the target variable has been made. In some implementations, indirect assignments to variables can be derived from one or more sources. For example, a variable "V" can be determined by assigning the sum of another variable "T" and a value "Inventory On-hand" accessed from a field included in a computer database table. Other external sources can be accessed to indirectly assign values to variables.

If an indirect assignment to the target variable has been made at step 214, the debugger can return the source code statement as the origination statement at step 216 and the process 200 can end. If an indirect assignment is not made to the target variable, the debugger can continue to step 218.

If an indirect assignment to the target variable is not made, the debugger determines whether a direct assignment to the target variable is made from a second variable at 218. If a direct assignment to the target variable is made from a second variable, the debugger can change the target variable to the second variable at step 220 and then automatically processes a source code statement at step 210. In some implementations, an indirect assignment can be made from a third variable.

Figure 2B:
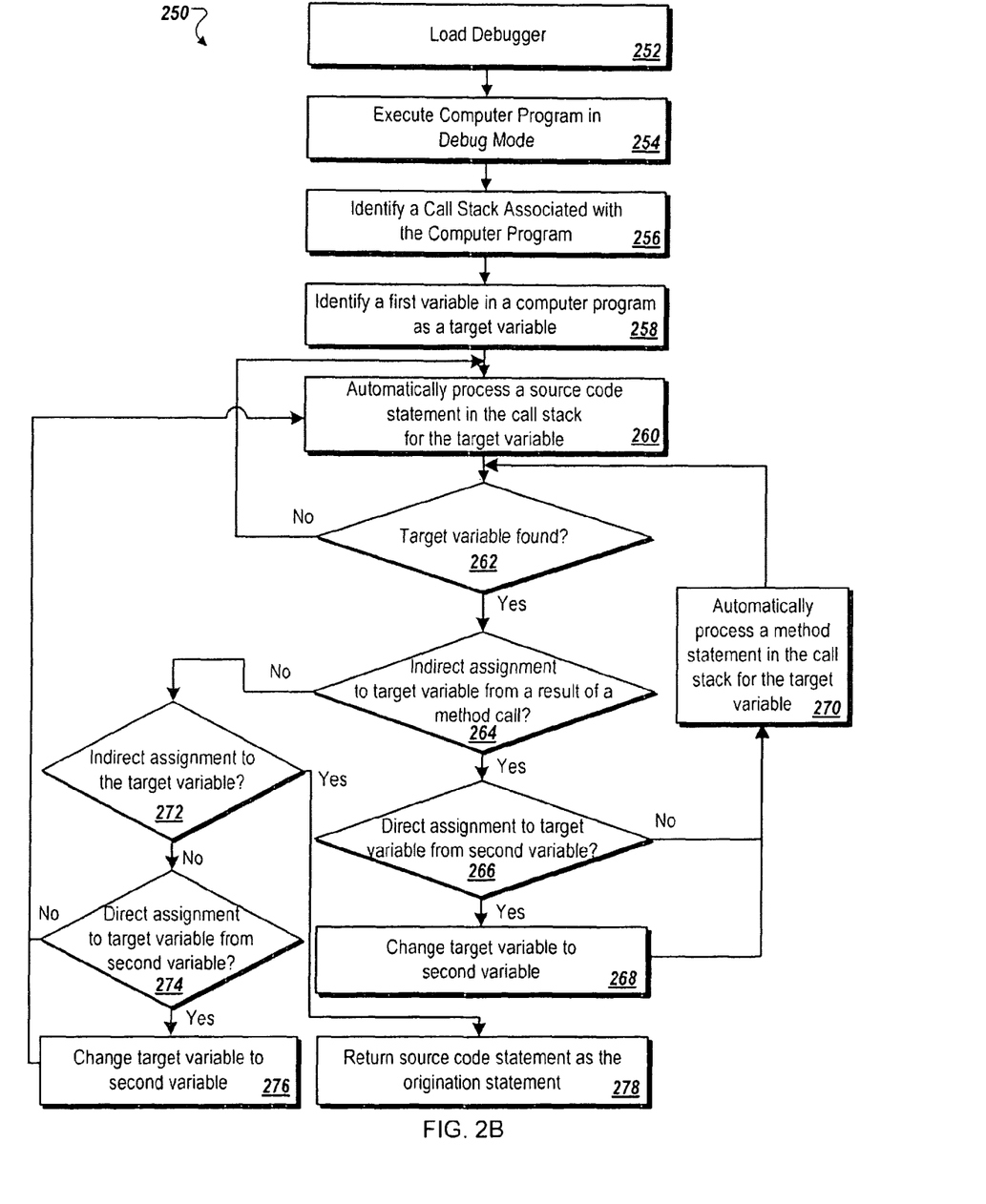
FIG. 2B is a flowchart illustrating another example of the steps for debugging computer programming source code using variable location using an appropriate system, such as the system described in FIG. 1.

FIG. 2B is a flowchart illustrating one example of the steps for debugging computer programming source code using variable location using an appropriate system, such as the system described in FIG. 1. For example, this example technique 250 could be represented by the pseudocode:

Start scanning backwards from the current statement along the execution history
    If V is a constant stop scanning.
    If the scanned statement does not alter V continue scanning.
    If the scanned statement is an assignment for V proceed below.
        If the statement is a direct assignment or equivalent to a direct assignment (e.g., V = W) then continue scanning for the source of the assignment (in the example this would be W).
        If the statement is a function or method call that produces V as an output then continue scanning for the source of this output (typically this is another variable or constant).
        If the statement is not a direct assignment (e.g., V = W + X or V is filled from a database) then stop.
    If all statements are scanned then stop.

In this example, a portion of programming source code can include a variable referenced by the name "V" In one example, the programming source code may encounter a problem during the debugging process and a user may believe that the variable "V" and its value can be the cause, can help find the cause of the problem, or otherwise be a desired variable to seek out. At the point where the programming source code fails or presents a problem, the debugging process can begin to scan from the point of failure in the call stack (e.g., call stack 114 of FIG. 1) to previous entries in the call stack. As each previous entry is scanned, various determinations can be made. If the variable "V" is found to be a constant, scanning can stop. If the scanned statement does not alter the value of variable "V," scanning can continue. If the scanned statement is an assignment for "V" additional determinations can be made as follows. If the statement is a direct assignment or equivalent to a direct assignment (e.g., V=W), then scanning can continue for the source of the assignment, in this example, "W." If the statement is a function or method call that produces "V" as an output, scanning can continue for the source of this output (typically, this is another variable or constant). If the statement is not a direct assignment (e.g., V=W+X or V is derived by a subroutine or method call or filled from a database), then scanning can stop. If the topmost level in the call stack is reached and all statements are scanned, then scanning can stop. The location where the implementation described above stops is at the place where the variable "V" derives the value of "V" from. The above implementation indicates the highest call stack level where the value of "V" was already known.

It will be understood that the foregoing pseudocode is for illustration purposes and is not meant to limit the scope of the disclosure. Put differently, the above example algorithm is meant to help provide context and description and other algorithms may implement functions and functionality disparate from it while remaining within the scope of the disclosure.

Turning to this illustrated example, a debugger (e.g., debugger 116 of FIG. 1) is loaded at step 252. In some implementations, the debugger 116 can be executed on a computer processor (e.g., the processor 110 of FIG. 1). At step 254, the processor executes a computer program in debug mode. For example, a user operating as a software developer may use a GUI (e.g., the GUI 106 of FIG. 1) to view and initiate execution of a portion or all of the software application he/she is developing. In this example, a user can view information that may be helpful to find a problem in the software. In another example, a user can simply monitor the execution of the software, viewing the values of certain variables and statements in a systematic way.

At 256, the debugger identifies a call stack (e.g., call stack 114 of FIG. 1). In some implementations, the call stack can be identified visually in the context of an entire suite of software development applications. For example, a call stack viewing application can provide a view of the most recent statement or method on the call stack, with preceding statements visible to the user in a list format. The call stack can be identified and accessed from the computer's memory 108.

At 258, the debugger identifies a first variable in a computer program as a target variable. In some implementations, identifying a variable can including selecting a "target" variable using a GUI (e.g., the GUI 106 from FIG. 1). In some implementations, a "target" variable can be automatically identified by the debugging software as a potential source of the computer program failure.

At 260, the debugger automatically processes a source code statement (e.g., source code 112 of FIG. 1) in the call stack for the target variable. In some implementations, the debugger can iterate through one or more preceding statements bound at runtime.

At 262, the debugger determines whether the target variable has been found. In some implementations, the debugger can parse and interpret the source code so that the debugger can recognize any value assignments. For example, the debugger can determine a numeric value assignment of "5" to a target variable "T."

At 264, the debugger determines whether an indirect assignment to the target variable from a result of a method call has been made. In some implementations, a method call can refer to a subroutine of source code to be executed by a processor (e.g., processor 110 of FIG. 1). For example, in object-oriented programming, the term method refers to a subroutine that is associated with a class or an object. In some implementations, a method can include a sequence of statements to perform an action, a set of input parameters to customize those actions and an output or "return" value. For example, a method can provide a mechanism for reading and writing data stored in an object or class. In some implementations, indirect assignments to variables can be derived from one or more sources. For example, a variable "V" can be assigned the value of a method call "CalculateOrder( )" or by adding the value of a method call "CalculateShippingCosts( )." In some implementations, other external sources can be accessed to assign values to variables. If an indirect assignment is made to the target variable from a result of a method call, the debugger can determine whether a direct assignment to the target variable from a second variable call has been made at step 266. If a direct assignment to the target variable is made from a second variable, the debugger can change the target variable to the second variable at step 268 and then return to automatically process a method statement in the call stack (e.g., call stack 114 of FIG. 1) for the target variable at step 270. For example, an assignment statement "X=Y," where "X" is the target variable, can cause the debugger to change the target variable to "Y" and then continue to process statements in the call stack for "Y" Specifically, the debugger determines whether a direct assignment to the target variable from a second variable call has been made. If a direct assignment to the target variable is made from a second variable in that method call, the debugger can change the target variable to the second variable at step 268, automatically processes a source code statement in the method at step 270, and then return to decision step 262. Otherwise, processing continues to process other method statements at step 270 and 262.

If an indirect assignment is not made to the target variable from a result of a method call at step 264, the debugger can determine whether an indirect assignment to the target variable is made at step 272. If an indirect assignment to the target variable is not made, the debugger can determine if a direct assignment to the target variable is made from a second variable at step 274. If a direct assignment to the target variable is made from a second variable, the debugger can change the target variable to the second variable at step 276 and can then return to step 260 to automatically process a source code statement in the call stack for the target variable. If a direct assignment to the target variable is not made at step 274, the debugger can automatically process a source code statement in the call stack for the target variable without changing the target variable to a second variable. If an indirect assignment to the target variable has been made at step 272, the debugger can return the source code statement as the origination statement at step 278 and the process 250 can end.

While the present disclosure uses a plurality of flowcharts and accompanying descriptions to illustrate the example techniques associated with the various disclosed methods and techniques, environment 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, environment 100 may use processes and methods with additional, fewer, and/or different steps, so long as the processes and methods remain appropriate.

Although this disclosure has been described in terms of certain implementation and generally associated methods, alterations and permutations of these implementations and methods will be apparent to those skilled in the art. Accordingly, other implementations are within the scope of the following claims.

What is claimed is:

1. A non-transitory computer-readable storage medium, the storage medium comprising computer readable instructions embodied on the non-transitory computer-readable storage medium, the instructions operable when executed by at least one processor to:

identify a first variable in an executing computer program as a target variable, the target variable automatically identified within the executing computer program as a potential source of failure of the computer program;

automatically process a first source code statement in a call stack of the computer program for the target variable;

if the target variable is not found in the processed first source code statement in the call stack, progress iteratively through individual preceding statements in the call stack of the computer program until the target variable is found in a particular one of the statements in the call stack; and in response to finding the target variable in the particular statement:

determine whether the particular statement in the call stack involves an indirect assignment to the target variable found in the particular statement;

in response to determining that the particular statement in the call stack involves an indirect assignment to the target variable found in the particular statement, return that particular statement from the call stack as an origination statement associated with the potential source of failure;

in response to determining that the particular statement in the call stack does not involve an indirect assignment to the target variable found in the particular statement, determine whether the particular statement in the call stack involves a direct assignment to the target variable from a second variable; and in response to determining that the particular statement in the call stack involves a direct assignment to the target variable from a second variable:

change the target variable to the second variable in the direct assignment in the particular statement, the second variable comprising a new target variable; and progress iteratively through individual preceding statements from the particular statement involving the direct assignment to the new target variable until the new target variable is found in a particular one of the statements in the call stack.

2. The non-transitory computer-readable storage medium of claim 1 further operable to:

if the particular statement in the call stack involves an indirect assignment to the new target variable, then return that particular statement from the call stack as the origination statement; and if the particular statement in the call stack involves a direct assignment to the target variable from a third variable, then:

change the target variable to the third variable, the third variable comprising a second new target variable; and progress iteratively through individual preceding statements from the particular statement involving the direct assignment to the new target variable until the second new target variable is found in a particular one of the statements in the call stack.

3. The non-transitory computer-readable storage medium of claim 1, the computer program written in one of a plurality of languages.

4. The non-transitory computer-readable storage medium of claim 1, the indirect assignment comprising the target variable being determined by a plurality of other variables.

5. The non-transitory computer-readable storage medium of claim 1, the indirect assignment comprising a result from a method call.

6. The non-transitory computer-readable storage medium of claim 1, the indirect assignment comprising population from an external source.

7. The non-transitory computer-readable storage medium of claim 6, the external source comprising a database.

8. The non-transitory computer-readable storage medium of claim 1 further operable to parse and map the statements of the computer program.

9. The non-transitory computer-readable storage medium of claim 1 further operable to progress through at least one preceding statement bound at runtime.

10. The non-transitory computer-readable storage medium of claim 1, the first variable consisting of a non-constant value.

11. A non-transitory computer-readable storage medium, the storage medium comprising computer readable instructions embodied on the non-transitory computer-readable storage medium, the instructions operable when executed by at least one processor to:

identify a first variable in an executing computer program as a target variable, the target variable automatically identified within the executing computer program as a potential source of failure of the computer program;

automatically process a first source code statement in a call stack of the computer program for the target variable;

if the target variable is not found in the processed first source code statement in the call stack, progress iteratively through individual preceding statements in the call stack of the computer program until the target variable is found in a particular one of the statements in the call stack; and in response to finding the target variable in the particular statement:

determine whether the particular statement in the call stack involves an indirect assignment to the target variable from a result of a method call;

in response to determining that the particular statement in the call stack involves an indirect assignment to the target variable from the result of the method call:

determine whether the method involves a direct assignment to the target variable from a second variable;

in response to determining that the method involves a direct assignment to the target variable from a second variable, change the target variable to the second variable; and progress iteratively through the individual statements in that method until the target variable is found in a particular one of the statements;

in response to determining that the particular statement in the call stack does not involve an indirect assignment to the target variable from the result of the method call, determine whether the particular statement in the call stack involves another indirect assignment to the target variable found in the particular statement;

in response to determining that the particular statement in the call stack involves another indirect assignment to the target variable found in the particular statement, return that particular statement from the call stack as an origination statement associated with the potential source of failure; and in response to determining that the particular statement in the call stack does not involve another indirect assignment to the target variable found in the particular statement:

determine whether the particular statement in the call stack involves a direct assignment to the target variable from a second variable;

in response to determining that the particular statement in the call stack involves a direct assignment to the target variable from a second variable:

change the target variable to the second variable in the direct assignment in the particular statement, the second variable comprising a new target variable; and progress iteratively through individual preceding statements from the particular statement involving the direct assignment to the new target variable until the new target variable is found in a particular one of the statements in the call stack.

12. The non-transitory computer-readable storage medium of claim 11 further operable to:

if the particular statement in the call stack involves an indirect assignment to the new target variable, then return that particular statement as the origination statement; and if the particular statement in the call stack involves a direct assignment to the target variable from a third variable, then:

change the target variable to the third variable, the third variable comprising a second new target variable; and progress iteratively through individual preceding statements from the particular statement involving the direct assignment to the new target variable until the second new target variable is found in a particular one of the statements in the call stack.

13. The non-transitory computer-readable storage medium of claim 11, the computer program written in one of a plurality of languages.

14. The non-transitory computer-readable storage medium of claim 11, the indirect assignment comprising the target variable being determined by a plurality of other variables.

15. The non-transitory computer-readable storage medium of claim 11, the indirect assignment comprising population from a database.

16. The non-transitory computer-readable storage medium of claim 11 further operable to parse and map the statements of the computer program.

17. The non-transitory computer-readable storage medium of claim 11 further operable to progress through at least one preceding statement bound at runtime.

18. The non-transitory computer-readable storage medium of claim 1, wherein the first source code statement in the call stack is identified as the most recent statement or method on the call stack.

19. The non-transitory computer-readable storage medium of claim 11, wherein the first source code statement in the call stack is identified as the most recent statement or method on the call stack.

* * * * *